(12) United States Patent
Knauf

(10) Patent No.: US 6,978,510 B2
(45) Date of Patent: Dec. 27, 2005

(54) WIPER SYSTEM WITH OVERLOAD PROTECTION

(75) Inventor: Richard Knauf, Roppenheim (FR)

(73) Assignee: Robert Bosch GmbH, Stuttgart (DE)

( * ) Notice: Subject to any disclaimer, the term of this patent is extended or adjusted under 35 U.S.C. 154(b) by 388 days.

(21) Appl. No.: 10/312,549

(22) PCT Filed: Jun. 21, 2001

(86) PCT No.: PCT/DE01/02293

§ 371 (c)(1),
(2), (4) Date: Dec. 31, 2002

(87) PCT Pub. No.: WO02/06097

PCT Pub. Date: Jan. 24, 2002

(65) Prior Publication Data

US 2004/0250368 A1 Dec. 16, 2004

(30) Foreign Application Priority Data

Jul. 13, 2000 (DE) .............................. 100 34 041

(51) Int. Cl.$^7$ ............................. B60S 1/18; B60S 1/56; B60S 1/58
(52) U.S. Cl. ............... 15/250.3; 15/250.31; 296/96.17; 296/96.2; 192/56.1; 192/56.6
(58) Field of Search ..................... 15/250.3, 250.31, 15/250.19; 296/96.15, 96.17, 96.2; 192/56.1, 192/56.6

(56) References Cited

U.S. PATENT DOCUMENTS

| | | | |
|---|---|---|---|
| 2,046,108 A | * | 6/1936 | Drew .......................... 15/250.3 |
| 2,693,612 A | * | 11/1954 | Zeigler et al. ............ 15/250.01 |
| 6,026,536 A | * | 2/2000 | Miller et al. .............. 15/250.31 |
| 6,240,593 B1 | * | 6/2001 | Murata ........................ 15/250.3 |
| 6,606,760 B1 | * | 8/2003 | Koumo et al. .............. 15/250.3 |
| 6,792,643 B1 | * | 9/2004 | Ponziani ................... 15/250.31 |

FOREIGN PATENT DOCUMENTS

| | | | |
|---|---|---|---|
| DE | 2728088 | * | 1/1978 |
| DE | 33 13 057 A | | 10/1984 |
| GB | 353336 | * | 7/1931 |
| GB | 1 448 892 A | | 9/1976 |
| WO | 99 19188 A | | 4/1999 |

OTHER PUBLICATIONS

Patent Abstracts of Japan vol. 2000, No. 12, Jan. 3, 2001 & JP 2000 238622A, Sep. 5, 2000.
Patent Abstracts of Japan vol. 2000, No. 01, Jan. 31, 2000 & JP 11 291873, Oct. 26, 1999.
Patent Abstracts of Japan, vol. 2000, No. 12, Jan. 3, 2001 & JP 2000 238618. Sep. 5, 2000.

* cited by examiner

*Primary Examiner*—Gary K. Graham
(74) *Attorney, Agent, or Firm*—MIchael J. Striker

(57) ABSTRACT

A wiper system for wiping a movable window (2), in particular of a motor vehicle, having a rotationally drivable first coupling part (10) for connection to a rotationally drivable drive shaft (9) disposed downstream of a stationary motor-gear unit (6), a second coupling part (15), which is connected to a wiper shaft (14) for driving a wiper (5), is movable in common with the window (2), and can be brought in centering fashion, relative to the drive shaft (9), with the first coupling part (10) in a torque-transmitting way along with the wiper shaft (14), and an overload-prevention means for limiting the torque that can be transmitted between the first coupling part (10) and the second coupling part (15), which prevention means is embodied in one piece with the first coupling part (10) and/or the second coupling part (15).

8 Claims, 6 Drawing Sheets

WIPER SYSTEM WITH OVERLOAD PROTECTION

BACKGROUND OF THE INVENTION

The invention relates to a wiper system for wiping a movable window, in particular of a motor vehicle.

From German Patent Disclosure DE 33 13 057 A1, a wiper system for windows is known. In it, the wiper arm, including the associated bearing system, is secured to a pivotable window. The motor-gear unit is connected in stationary fashion to the vehicle body. For centering, a centering peg is provided on the vehicle body and can be brought into engagement with a driver disposed on the window and with a centering indentation. On the vehicle body, eccentrically to the centering peg, a peg that is insertable counter to a spring force is provided on the end of a rotationally drivable arm and can be brought into engagement with a receiving bore, disposed in the driver, for torque transmission. The overall arrangement is complicated in design and comprises a great number of individual parts.

SUMMARY OF THE INVENTION

The object of the invention is to create a wiper system for wiping a movable window in which the torque transmission is assured as simply as possible, with simultaneous protection against overload in order to limit the torque that can be transmitted.

The nucleus of the invention is to provide a overload-prevention means for limiting the torques that can be transmitted; this means is embodied in one piece with the first coupling part and/or the second coupling part.

The advantage of a further embodiment is that because of the engagement of the frustoconical second coupling part with the correspondingly cup-shaped first coupling part, self-centering of the two shafts and simultaneously a play-free connection are achieved.

By means of the one-piece embodiment of the detent arm and the second coupling part, which engages a corresponding detent recess a way of creating the overload-prevention means that is especially simple from the standpoint of production technology is achieved.

The resilient prestressing of the wiper shaft assures that no play will arise in the axial direction.

The locking device has the advantage that the position of the wiper arm is fixed when the window is open, so that after the window is closed again, the desired wiping range is again automatically set.

BRIEF DESCRIPTION OF THE DRAWINGS

Additional advantages and details of the invention will become apparent from the description of an exemplary embodiment, taken in conjunction with the drawing.

DETAILED DESCRIPTION OF THE PREFERRED EMBODIMENTS

Figure 1:
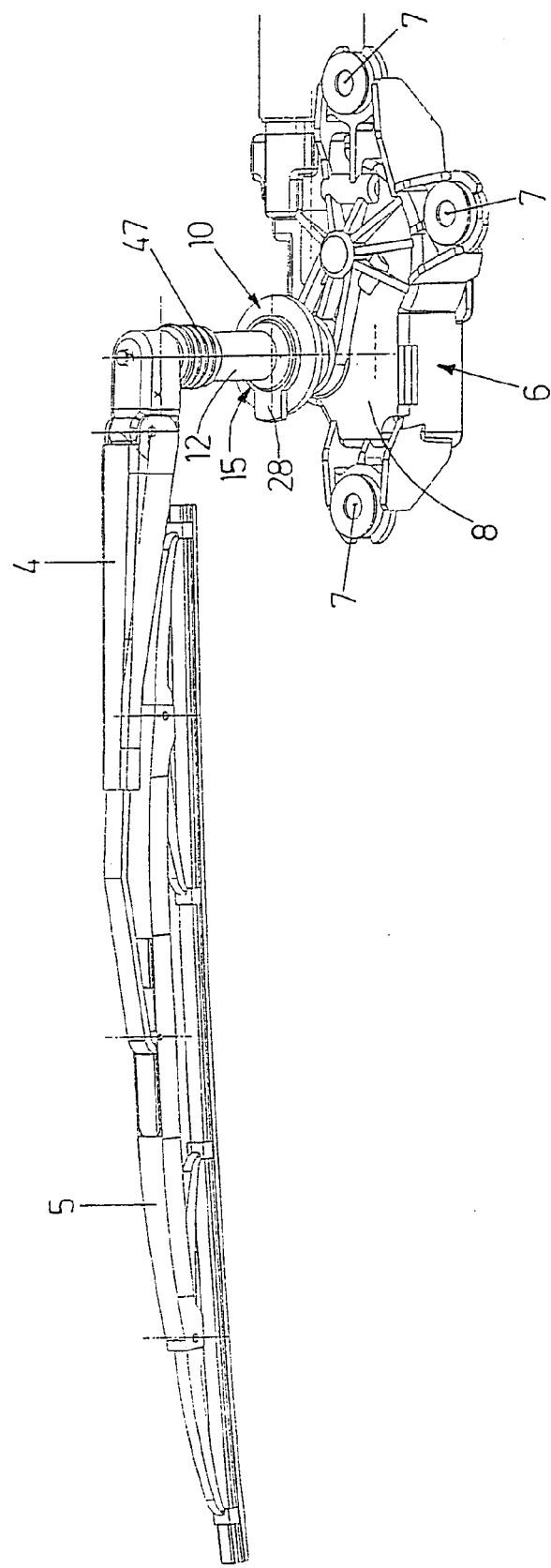
FIG. 1 is a schematic view of a wiper system of the invention, without the window.
Figure 2:
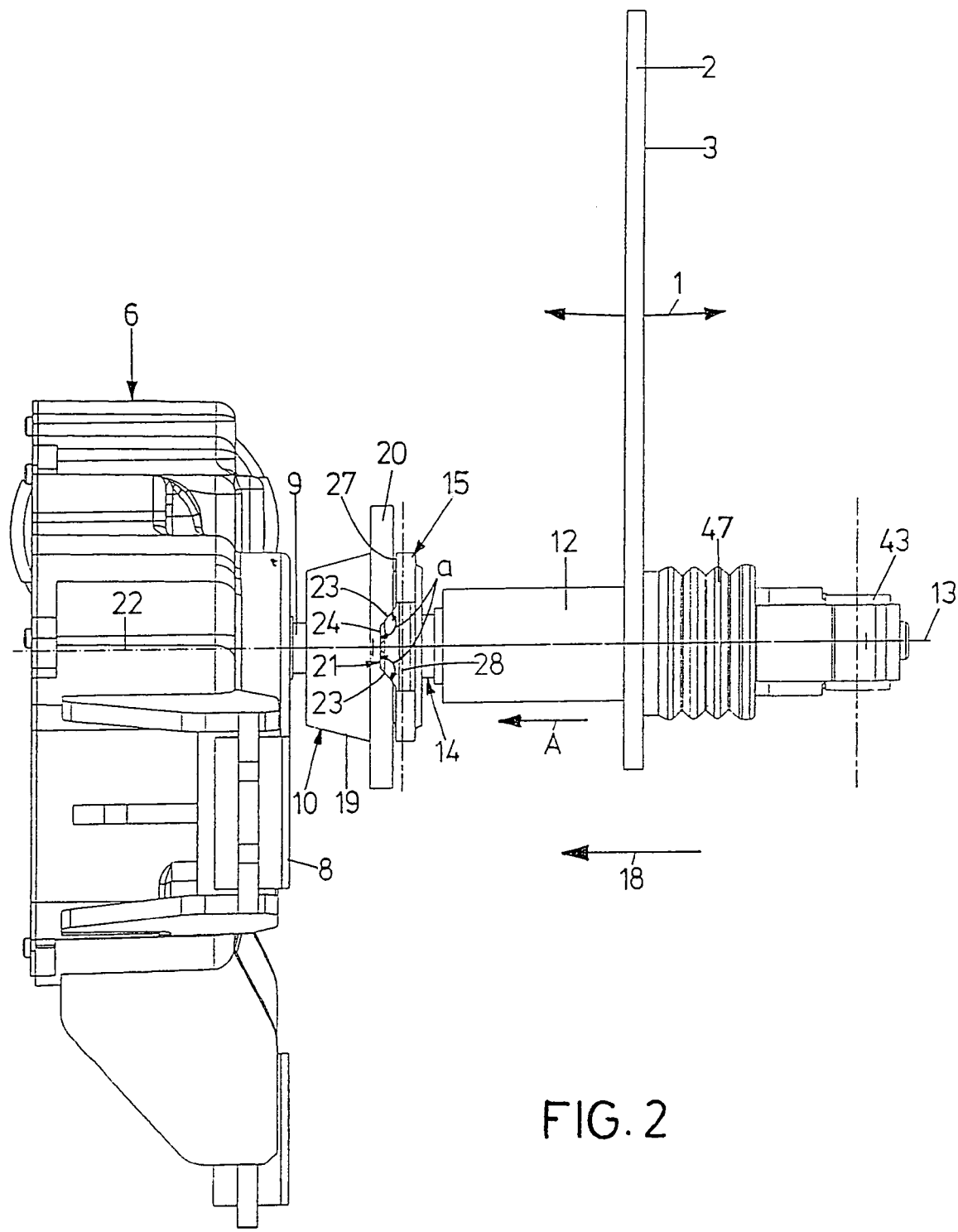
FIG. 2 is a side view of the wiper system with the window in the closed position.
Figure 3:
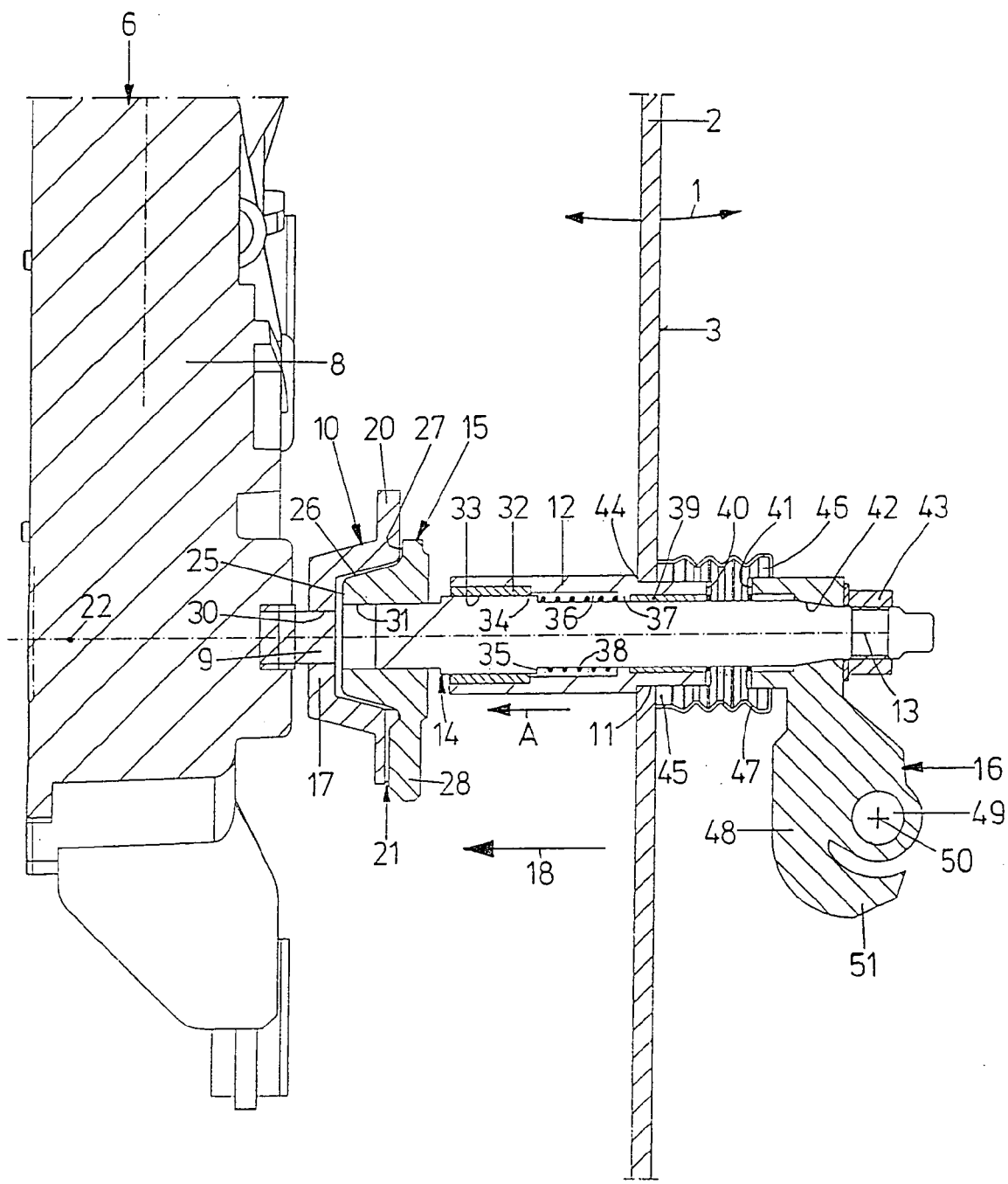
FIG. 3 is a cross-sectional view of the wiper system and the window, in the closed position.

A motor vehicle, in the region of its rear end, has a window 2 that is pivotable in a pivoting direction 1 and has a wiper system. On the outside 3 of the window 2, a wiper 5 for wiping the window 2 is provided, pivotably connected via a wiper arm 4. For driving the wiper 5, a conventional motor-gear unit 6 is provided, which in its peripheral region has a plurality of bores 7 for screwing the motor-gear unit 6 to the body of the motor vehicle. Part of a rotationally drivable drive shaft 9, to whose outward-pointing end a coupling part 10 is secured, protrudes from the housing 8 of the motor-gear unit 6. The window 2 has a circular recess 11, which in the closed position shown in FIGS. 2 and 3 is located opposite the coupling part 10. The recess 11 receives a substantially annular-cylindrical bearing bush 12, which is connected to the window 2. A wiper shaft 14 that is pivotable about an axis 13 is supported in the bearing bush 12 and is also guided displaceably along the axis 13. A coupling part 15 is secured to the end of the wiper shaft 14 oriented toward the coupling part 10, and in a torque-transmitting way, along with the wiper shaft 14, it can be brought into centering engagement with the coupling shaft 10 relative to the drive shaft 9. On the opposite end of the wiper shaft 14, a connection piece 16 joined to the wiper shaft 14 is provided, to which the wiper arm 4 is secured.

The coupling part 10 is embodied as essentially cup-shaped, with a bottom 17. The bottom 17 is adjoined by an annular side wall 19, which widens conically in the direction counter to an insertion direction 18, and a radially protruding stop ring 20 is provided on its end located counter to the insertion direction 18. The bottom 17, side wall 19, and stop ring 20 are embodied integrally with one another. On the side of the stop ring 20 toward the window 2, a radially outward-extending, groovelike detent recess 21 is provided. In the radial direction—relative to the axis 22 about which the drive shaft 9 is rotatable—the detent recess has a trapezoidal cross section. The sides 23 of the trapezoid form an angle a with the base 24 of the trapezoid. The width of the base 24 increases as the distance from the axis 22 decreases; that is, the detent recess 21 tapers in the radial direction.

The coupling part 15 has an essentially frustoconical shape, with a bottom 25, an adjoining jacket 26, and a radially protruding, annular stop edge 27 adjoining the jacket. The diameter of the frustoconical coupling part 15 tapers in the insertion direction 18. The coupling part 15 also has a radially protruding detent arm 28, which is provided on the end of the coupling part 15 counter to the insertion direction 18. The bottom 25, jacket 26, along with the stop edge 27 and the detent arm 28, are embodied in one piece with one another. The detent arm 28 has a trapezoidal detent protrusion 29 that protrudes trapezoidally toward the coupling part 10. The detent protrusion 29 is embodied such that it can be brought into engagement with the detent recess 21, so that a positive-engagement connection between the coupling part 10 and the coupling part 15 is possible in the tangential direction, in terms of the axes 13 and 22. The diameter and the inclination of the jacket 26 are selected such that the coupling part 15 can be received by positive engagement in the coupling part 10, without slip in either the radial or the axial direction. In the assembled state, shown in FIGS. 2 and 3, the stop edge 27 comes to a stop against the stop ring 21. The coupling parts 10 and 15 have respective bores 30 and 31 in the middle, in which the ends toward one another of the drive shaft 9 and wiper shaft 14, respectively, are secured. The detent recess 21 and the detent arm 28 cooperating with it together form a overload-prevention means for limiting the torque that can be transmitted between the coupling part 10 and the coupling part 15. Above a given torque to be transmitted, the detent protrusion 29 slips over the sides 23 onto the stop ring 20, and in that state torque transmission is no longer possible. The maximum torque that can be transmitted is determined by the contact pressure A, exerted in the insertion direction 18, and the angle a, in conjunction with the coefficients of friction dictated by the materials of which the coupling parts 10 and 15 are made.

Below, the bearing of the wiper shaft 14 in the bearing bush 12 will be described in more detail. On the end of the bearing bush 12 pointing in the insertion direction 18, an annular-cylindrical sintered bush 32 embodied as a bearing is provided; it is secured to the bush 12. A cylindrical sliding rib 34 protruding radially from the shaft 14 is located on the inside face 33 of the sintered bush 32. The sliding edge 34 is limited in the direction counter to the insertion direction 18 by a stop edge 35. Between the shaft 14 and the bush 12, downstream of the stop edge 35 in the direction counter to the insertion direction 18, an annular chamber 36 is provided, which is defined on its other end by an annular rib 37 protruding inward from the bush 12. In the annular chamber 36, a spiral spring 38 is disposed between the rib 37 and the stop edge 35, so that the shaft 14 is insertable resiliently into the bush 12 counter to the insertion direction 18. Downstream of the rib 37, counter to the insertion direction 18, is a further sintered bush 39, embodied as a bearing, on whose inside the shaft 14 is slidingly supported. The sintered bush 39 is solidly joined to the bush 12. On the face end of the bush 12 located counter to the insertion direction 18, a ring gear 40 is provided. The connection piece 16 connected to the shaft 14 in a manner fixed against relative rotation, has, on the side opposite the ring gear 40, a corresponding ring gear 41, whose teeth are selected such that they can be made to mesh with the teeth of the ring gear 40. If the ring gears 40 and 41 are meshing with one another, then a positive-engagement connection is created in the tangential direction between the bush 12 and the connection piece 16, so that the wiper arm cannot be pivoted. The ring gears 40 and 41 together form a locking device. The connection piece 16 has a bore 42, which tapers counter to the insertion direction 18 and in which a correspondingly tapering portion of the shaft 14 is received. Because of the conical taper, the connection piece 16 is fixed in the insertion direction 18. On the opposite end, the connection piece 16 is secured by a nut 43 provided on the shaft 14. The bush 12 is joined to the window 2 on one side by a contact edge 44 protruding radially from the bush 12 and on the other side by an annular disk 45 that is joined to the bush 12. Adjacent to the ring gear 41, an annular disk 46 is provided, which is connected to the connection piece 16. Between the disks 45 and 46, a bellows 47 surrounded the shaft 14 is provided, which is joined to the two disks 45 and 46 and protects the space between the two ring gears 40 and 41 against penetration by dirt. The connection piece 16 essentially has the shape of a lever, extending radially from the axis 13, with an arm 48, in which a bearing 49 with an axis 50 is provided. The axes 13 and 50 extend essentially perpendicular to one another. A lug 51 cooperating with the wiper arm 4 is disposed downstream of the bearing 49, in the radial direction relative to the axis 13, and points counter to the insertion direction 18.

Figure 4:
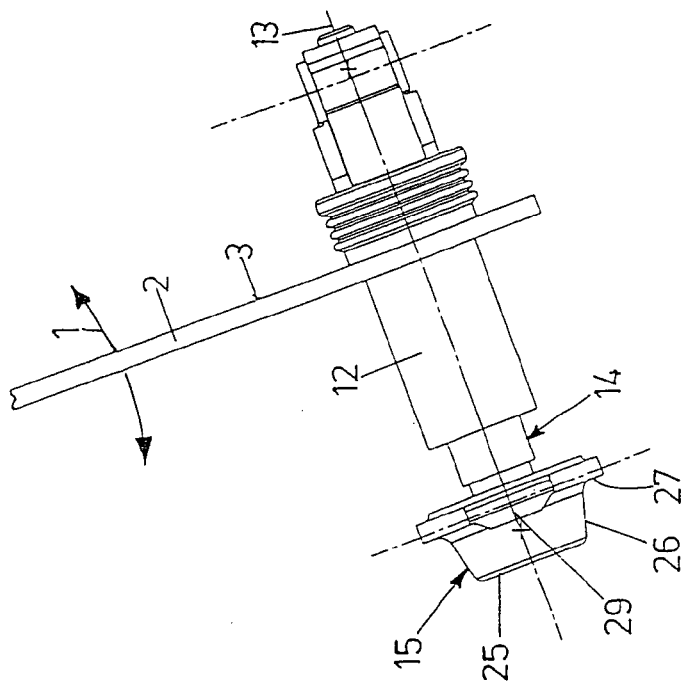
FIG. 4 is a view as in FIG. 2, with the window in the open position.
Figure 4:
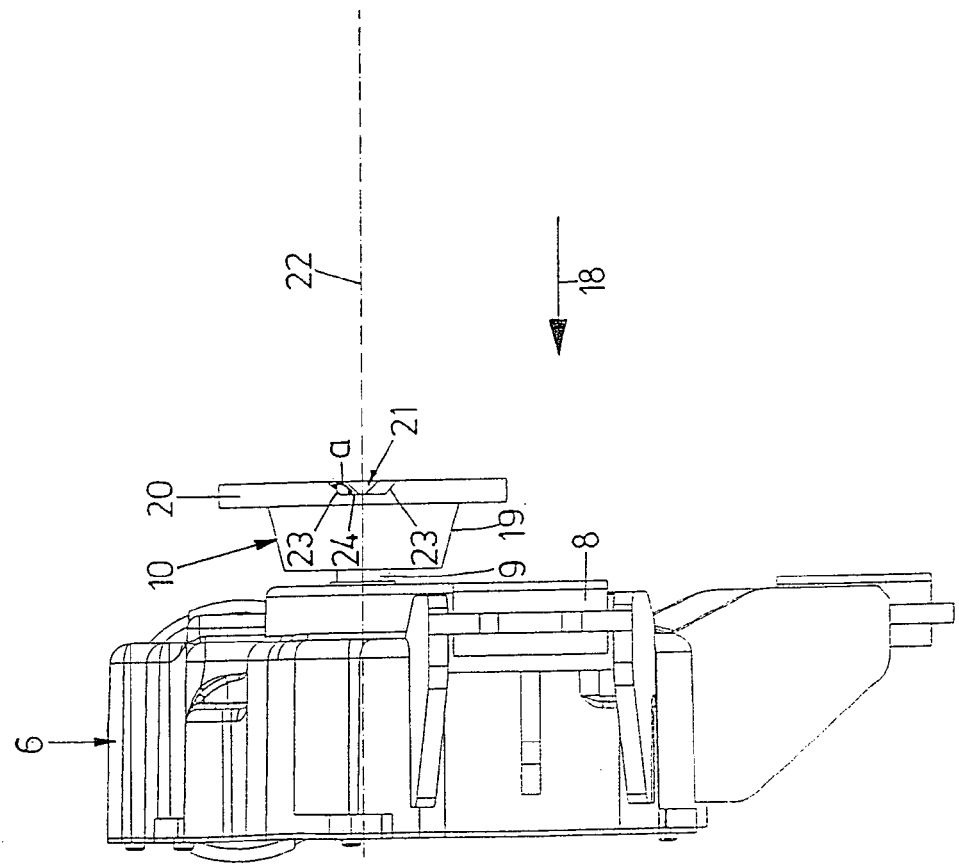
Figure 5:
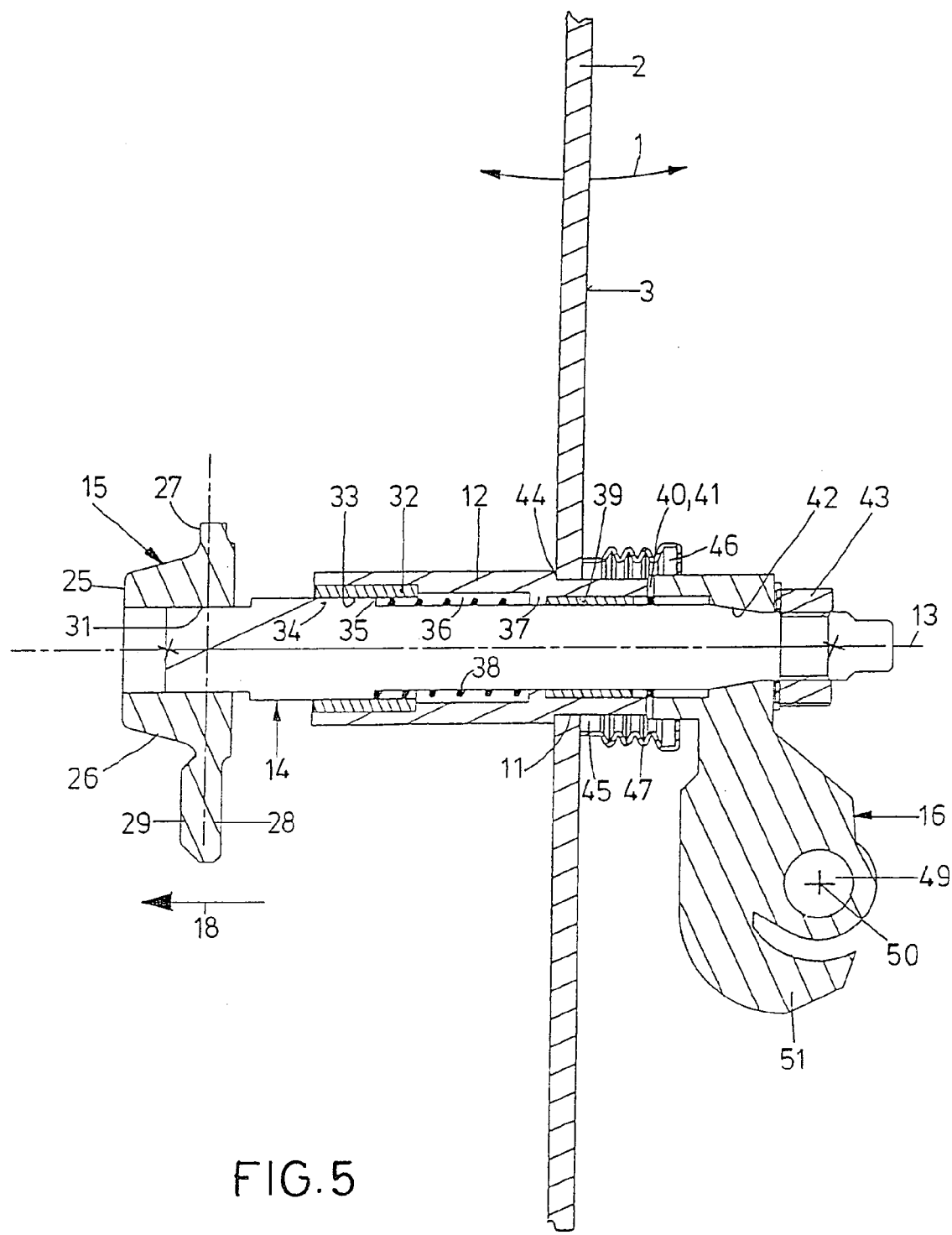
FIG. 5 is a fragmentary cross-sectional view of the wiper system of FIG. 3 with the window in the open position.
Figure 6:
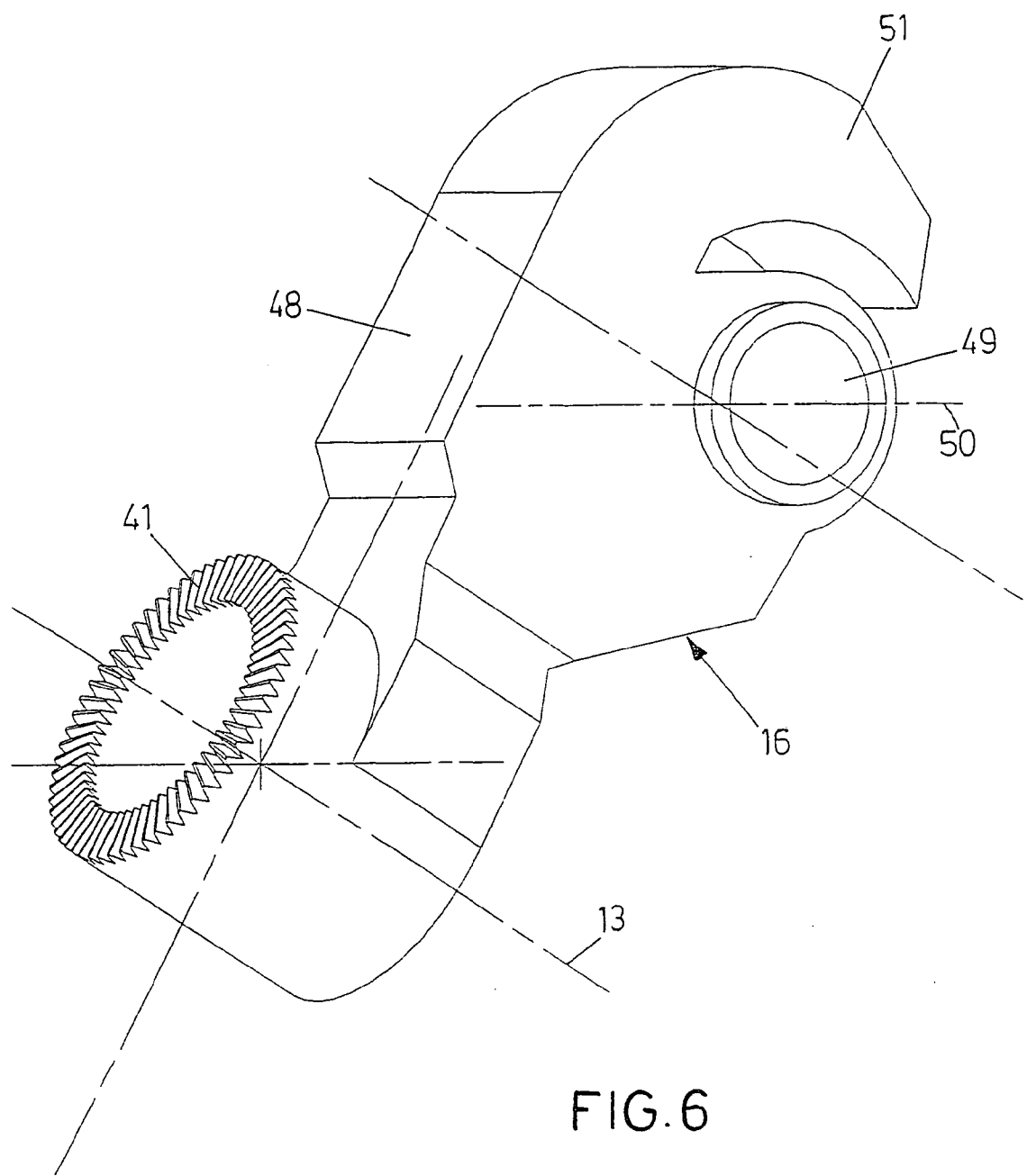
FIG. 6 is a plan view on a connection piece.

The function of the wiper system will now be described with the window 2 closed. By means of the motor-gear unit 6, the coupling part 10 is set into rotation about the axis 22. By means of the engagement between the detent recess 21 and the detent arm 28, the torque is transmitted to the coupling part 15 and thus via the connection piece 16 to the wiper 5. If the window 2 is opened, then the bush 12 and shaft 14 reach the open position shown in FIGS. 4 and 5. First, upon outward pivoting of the window 2, the coupling part 15 is put out of engagement with the coupling part 10. The same is true for the detent protrusion 29. Because the contrary force formed in FIG. 3 by the coupling part 10 is now absent, the spring 38 displaces the shaft 14 into the position shown in FIG. 5. As a result, the ring gears 40 and 41 come closer to one another and enter into engagement with one another. In this way, it is assured that the wiper arm 4 is locked above the window 2 in a manner secured against pivoting. Upon inward pivoting again, that is, closure, of the window 2, the coupling part 15 is introduced into the coupling part 10. As soon as the window is closed, the locking is undone, since the shaft with the wiper arm is displaced outward by the coupling part. Before the detent recess and the detent protrusion snap into place, the wiper arm is held by the friction of the rubber wiper on the window. By means of the faces adapted conically to one another, that is, the side wall 19 and the jacket 26, automatic centering of the shaft 14 relative to the shaft 9 ensues. In the event that the detent recess 21 and the detent arm 28 face one another, the two enter into engagement with one another. If that is not the case, then first the detent arm 28 rests on the stop ring 20. Upon subsequent initiation of operation, the coupling part 10 executes at maximum one revolution until the detent recess 21 and the detent protrusion 29 enter into engagement with one another, so that the wiping process can then begin. When the coupling part 10 and the coupling part 15 enter into engagement with one another, the locking between the ring gear 40 and the ring gear 41 is undone. Since only one detent recess 21 is provided along the circumference, the relative positioning of the wiper arm 40 with respect to the motor-gear unit 6 is always defined unambiguously, so that the correct wiping range will be swept. In the event that the wiper arm 4 is blocked, the overload-prevention means described above causes the detent protrusion 29 to slide out of the detent recess 21, so that no further torque transmission occurs.

What is claimed is:

1. A wiper system for wiping a movable window (2), in particular of a motor vehicle, having
   a) a rotationally drivable first coupling part (10) for connection to a rotationally drivable drive shaft (9) disposed downstream of a stationary motor-gear unit (6),
   b) a second coupling part (15), which
      i) is connected to a wiper shaft (14) for driving a wiper (5),
      ii) is movable in common with the window (2), and
      iii) can be brought in centering fashion, relative to the drive shaft (9), with the first coupling part (10) in a torque-transmitting way along with the wiper shaft (14), and
   c) an overload-prevention means for limiting the torque that can be transmitted between the first coupling part (10) and the second coupling part (15),
      i) wherein the prevention means is embodied in one piece with the first coupling part (10) and/or the second coupling part (15), and ii) wherein the overload-prevention means has a detent arm (28), wherein the detent arm is embodied in one piece with the second coupling part (15) or with the first coupling part (10), and wherein the detent arm radially protrudes from the second coupling part (15) or the first coupling part (10), and wherein the first coupling part (10) and/or the second coupling part (15) has a detent recess (21) for engagement with the detent arm (28).

2. The wiper system of claim 1, wherein the first coupling part (10) or the second coupling part (15) is embodied in cup-shaped form.

3. The wiper system of claim 2, wherein the first coupling part (10) and/or the second coupling part (15) is embodied in frustoconical form.

4. The wiper system of claim 1, wherein the detent recess (21), in the radial direction, has an essentially trapezoidal cross section.

5. The wiper system of claim 1, wherein the second coupling part (15) is displaceably resiliently along the wiper shaft (14) toward the first coupling part (10).

6. The wiper system of claim 5, wherein the second coupling part (15), in engagement with the first coupling part (10), is prestressed along the wiper shaft (14) toward the first coupling part (10).

7. The wiper system of claim 1, wherein a looking device is provided for locking the wiper shaft (14) against pivoting motions, when the first coupling part (10) is out of engagement with the second coupling part (15).

8. The wiper system of claim 7, wherein the locking device has two ring gears (40, 41) that can be made to mesh with one another.

* * * * *